(12) United States Patent
Kubo et al.

(10) Patent No.: US 7,169,214 B2
(45) Date of Patent: Jan. 30, 2007

(54) HIGH PRESSURE TANK

(75) Inventors: Hidehito Kubo, Kariya (JP); Makoto Tsuzuki, Kariya (JP); Keiji Toh, Kariya (JP); Akiko Kumano, Kariya (JP); Daigoro Mori, Mishima (JP); Masahiko Kimbara, Okazaki (JP)

(73) Assignees: Kabushiki Kaisha Toyota Jidoshokki, Kariya (JP); Toyota Jidosha Kabushiki Kaisha, Toyota (JP)

( * ) Notice: Subject to any disclaimer, the term of this patent is extended or adjusted under 35 U.S.C. 154(b) by 441 days.

(21) Appl. No.: 10/762,886

(22) Filed: Jan. 21, 2004

(65) Prior Publication Data

US 2004/0182869 A1 Sep. 23, 2004

(30) Foreign Application Priority Data

Jan. 24, 2003 (JP) ............................. 2003-016610
Mar. 11, 2003 (JP) ............................. 2003-064633

(51) Int. Cl.
*F17C 13/06* (2006.01)

(52) U.S. Cl. ..................... 96/108; 220/582; 220/588; 277/590

(58) Field of Classification Search .............. 96/108, 96/147, 146; 206/0.6, 0.7; 220/581, 582, 220/585, 586, 588, 589, 590, 591, 592; 277/590
See application file for complete search history.

(56) References Cited

U.S. PATENT DOCUMENTS 3,843,010 A * 10/1974 Morse et al. ............... 220/590
4,854,343 A    8/1989 Rilett ....................... 137/543.19
4,854,988 A *  8/1989 Voirol et al. ................ 156/155
5,095,886 A *  3/1992 Schmed ...................... 220/240
5,518,141 A *  5/1996 Newhouse et al. .......... 220/586
6,227,402 B1 * 5/2001 Shimojima et al. ......... 220/581

FOREIGN PATENT DOCUMENTS

| EP | 1 141 618 | 10/2001 |
|----|-----------|---------|
| JP | 3-213800 | 9/1991 |
| JP | 9-112796 | 5/1997 |
| JP | 10-86229 | 4/1998 |
| JP | 2002-181295 | 6/2002 |
| WO | WO 92/10702 | 6/1992 |

* cited by examiner

Primary Examiner—Frank M. Lawrence
(74) Attorney, Agent, or Firm—Morgan & Finnegan L.L.P.

(57) ABSTRACT

A high pressure tank has a cylindrical liner and a fiber reinforced plastic layer which covers the outer surface of the liner. At least one end of the liner is separable. The liner includes a cylindrical liner body and a lid. An O-ring is located between the contact surfaces of the liner body and the lid in the circumferential direction. Each contact surface has a seal surface which contacts the O-ring. One of the liner body and the lid has a deformable portion which deforms toward the seal surfaces. The structure can securely seal the separated portions of the liner when the high pressure tank is in a high pressure state.

17 Claims, 10 Drawing Sheets

HIGH PRESSURE TANK

BACKGROUND OF THE INVENTION

The present invention relates to a high pressure tank having a hollow liner and a fiber reinforced resin layer which covers the outer surface of the liner.

Awareness of the need to restrain global warming has been increasing recently. Particularly, developments in fuel-cell electric vehicles and hydrogen-powered vehicles have been made progressively for the purpose of reducing carbon dioxide which is emitted from vehicles. These vehicles induce power by electrochemical reaction of hydrogen and oxygen and supply the power to motors to generate drive force. A hydrogen tank is used as a hydrogen source and is filled with hydrogen at high pressure.

FIG. 16 is a cross-sectional view of a hydrogen tank 51 for use as a high pressure tank disclosed in Japanese Laid-Open Patent Publication No. 2002-181295. The hydrogen tank 51 has a liner 52 having a hollow barrel shape. The liner 52 is made of a material which ensures an airtight condition (e.g., high-density polyethylene). A top boss 53 and an end boss 54 made of aluminum or the like which has high thermal conductance are respectively secured to the front end and rear end of the liner 52. The top boss 53 and the end boss 54 are assembled while partly exposed to the outside. Heat exchange is carried out between the interior of the hydrogen tank 51 and the outside via the top boss 53 and the end boss 54.

A shell 55 is coated on the entire outer surface of the liner 52. The shell 55 is made of a material which can ensure pressure resistance (e.g., fiber reinforced plastics (FRP)). The liner 52 houses a fin assembly 58 including a plurality of fins 56 and a shaft member 57 which supports the fins 56. Both ends of the shaft member 57 are respectively secured to the top boss 53 and the end boss 54. The fin assembly 58 is made of aluminum or the like which has high thermal conductance.

In a case where the liner 52 housing the fin assembly 58 is manufactured integrally, the juncture portions of the liner 52 and the fin assembly 58 are subjected to vacuum brazing and spinning. As the spinning process applies heat to the liner 52, however, the strength of the liner 52 is lowered, making the liner 52 easier to break. This requires that the liner 52 be subjected to a heat treatment again at, for example, 500 degrees. However, the re-heat treatment may cause separation of the brazed portions or a failure in locally disposed seals. It is therefore necessary to prepare a separable liner in the case where the liner is assembled into the fin assembly 58.

FIGS. 17(a) and 17(b) are partial cross-sectional views exemplarily and partially illustrating hydrogen tanks respectively using separable liners 152 and 252. Each of the liners 152 and 252 has a body portion 59 which has an approximately cylindrical shape and a lid 60 which covers the opening portion of the body portion 59. In the case of the liner 152 in FIG. 17(a), an O-ring 62 is disposed on a seal surface 61 which extends in the radial direction of the liner 152 on one of the contact surfaces of the body portion 59 and the lid 60. In the case of the liner 252 in FIG. 17(b), on the other hand, the O-ring 62 is disposed on a seal surface 53 which extends in the axial direction of the liner 252.

In a hydrogen tank where internal pressure becomes high, the gas pressure expands the liner 152, 252 outward in the axial direction or the radial direction. In the case of the liner 152 in FIG. 17(a), therefore, when the lid 60 is pushed outward in the axial direction (in the state indicated by the two-dot chain line) by the internal gas pressure, the O-ring 62 cannot seal between the body portion 59 and the lid 60, causing gas leakage. In the case of the liner 252 in FIG. 17(b), on the other hand, when the body portion 59 is pushed outward in the radial direction (in the state indicated by the two-dot chain line) by the gas pressure, the O-ring 62 cannot seal between the body portion 59 and the lid 60, causing gas leakage.

The shell of the hydrogen tank receives stress in the axial direction and the radial direction of the hydrogen tank. The ratio of the forces acting in the axial direction and the radial direction of the hydrogen tank 51 is one in the axial direction to two in the radial direction. It is therefore most preferable that the reinforced fibers constituting the shell be laid out both in the direction parallel to the axial direction and the circumferential direction. It is however difficult to lay out reinforced fibers in the direction parallel to the axial direction of the hydrogen tank. In this respect, conventionally, reinforced fibers are laid out corresponding to in-plane winding or helical winding with respect to both the axial-directional ends of the hydrogen tank and are laid out corresponding to in-plane winding or to a combination of helical winding and hoop winding with respect to the cylindrical portion (body portion) other than the ends. As it is difficult to repeatedly perform hoop winding on each end wall, the strength in the radial direction is ensured by helical winding. Because helical winding provides lower strength against radial-directional force relative to hoop winding, however, gas leakage occurs.

SUMMARY OF THE INVENTION

Accordingly, it is an objective of the present invention to provide a high pressure tank capable of reliably sealing the separated portions of a liner.

To achieve the above object, the present invention provides a following high pressure tank. The high pressure tank comprises a metal hollow liner which stores a high pressure gas and a fiber reinforced plastic layer which covers an outer surface of the liner. The liner includes a liner body having an opening portion and a lid to be connected to the liner body in such a way as to close the opening portion. The liner body and the lid have contact surfaces facing each other around the opening portion. A seal member is provided between both contact surfaces and extending around the opening portion. Those portions of the contact surfaces which come in contact with the seal member serve as seal surfaces. One of the liner body and the lid has a deformable portion. The deformable portion is deformable by pressure in the liner in such a way as to direct one of the seal surfaces toward the other seal surface.

The present invention also provides another high pressure tank. The high pressure tank comprises a hollow liner which stores a high pressure gas and a fiber reinforced plastic layer which covers an outer surface of the liner. An assembly is retained inside the liner. The liner includes a cylindrical liner body having an opening portion in at least one axial-directional end thereof, and a lid to be connected to the liner body in such a way as to close the opening portion. The assembly is inserted into the liner body via the opening portion. The lid has a protruding portion to be fitted into the opening portion and a flange larger in diameter than the protruding portion. A seal member is provided between a peripheral surface of the protruding portion and that portion of the liner body which faces the peripheral surface. The liner body has an annular recess portion which surrounds the opening portion at a portion corresponding to the opening portion. An annular reinforcing portion is provided in the recess portion to prevent enlarging of the opening portion.

The present invention further provides a method of manufacturing a high pressure tank. The high pressure tank has a hollow liner which retains an assembly having a heat exchanging capability and a fiber reinforced plastic layer which covers an outer surface of the liner. The liner includes a cylindrical liner body having an opening portion in at least one axial-directional end thereof and a lid that closes the opening portion. The method comprises a step of inserting the assembly into the liner body via the opening portion; a step of fitting a protruding portion provided on the lid into the opening portion, with a seal member disposed between a peripheral surface of the protruding portion and a portion of the liner body which faces the peripheral surface; a first winding step of winding a bundle of resin-impregnated fibers into an annular recess portion formed in a portion of an outer surface of the liner body which corresponds to the opening portion; and a second winding step of winding a bundle of resin-impregnated fibers on the outer surface of the liner by filament winding after the first winding step, whereby as a resin is cured, the fiber reinforced plastic layer is formed on the outer surface of the liner.

The other modes of the present invention and advantages thereof should be apparent from the following description in conjunction with the accompanying drawings which illustrate an example of the principle of the present invention.

BRIEF DESCRIPTION OF THE DRAWINGS

The features of the present invention that are believed to be novel are apparent particularly in the appended claims. The present invention, together with the object and advantages thereof, may best be understood by reference to the following description of the presently preferred embodiments together with the accompanying drawings.

DETAILED DESCRIPTION OF THE PREFERRED EMBODIMENTS

A first embodiment of the present invention is described below with reference to FIGS. 1 to 4.

Figure 1:
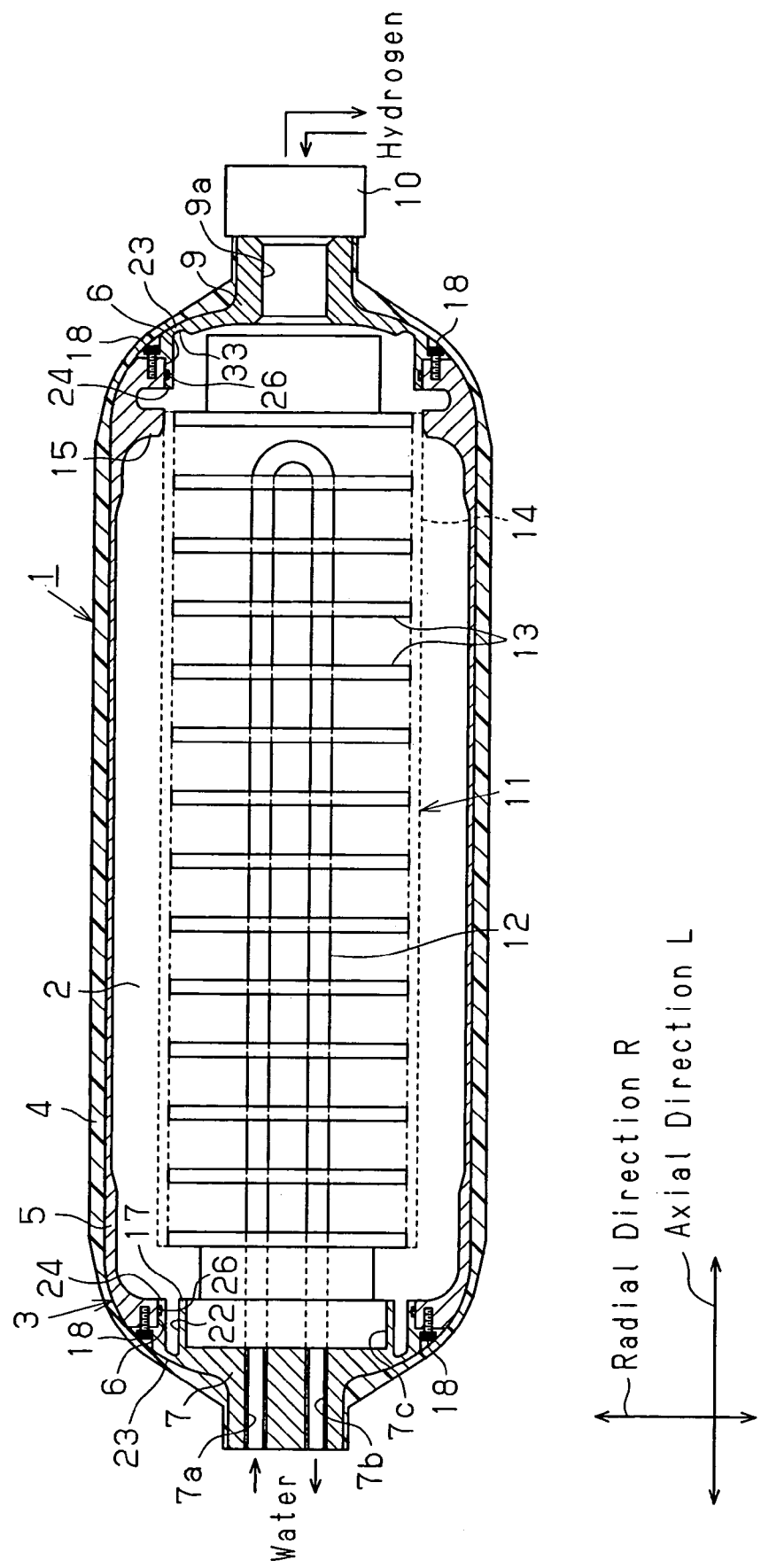
FIG. 1 is a schematic cross-sectional view of a hydrogen tank according to a first embodiment of the present invention.

FIG. 1 is an exemplary cross-sectional view of a hydrogen tank 1. The hydrogen tank 1 for use as a high pressure tank has an elongated cylindrical shape and has a liner 3 inside. A retaining chamber 2 is defined in the liner 3. The retaining chamber 2 is filled with hydrogen as the gas under high pressure. A lot of hydrogen can be filled inside the retaining chamber 2 by setting the interior of the retaining chamber 2 to a relatively high pressure. In the case where the pressure in the retaining chamber 2 is set to 25 Mpa, for instance, hydrogen about 250 times as great as that of air can be filled. One of the ends of the hydrogen tank 1 is where hydrogen comes enters and exits is the distal end (right-hand side in FIG. 1), and the opposite end is the proximal end (left-hand side in FIG. 1).

The liner 3 of the hydrogen tank 1 has an approximately cylindrical shape and a high-strength carbon fiber reinforced plastic (CFRP) layer 4 which covers approximately the entire outer surface of the liner 3. The high-strength CFRP layer 4 is formed by winding carbon fibers impregnated with a resin (e.g., unsaturated polyester resin, epoxy resin or the like) on the liner 3 in such a way as to have a helical winding layer and a hoop winding layer, and thermally curing the resin. The high-strength CFRP layer 4 ensures the pressure resistance (mechanical strength) of the hydrogen tank 1.

The liner 3 is made of, for example, an aluminum alloy and functions to ensure the air-tightness of the hydrogen tank 1. The liner 3 is a separable type and has a body portion 5 as a liner body with an approximately cylindrical shape, a first lid portion 7 as a lid to cover a proximal-end side opening portion 6 of the body portion 5 and a second lid portion 9 as a lid to cover a distal-end side opening portion 6 of the body portion 5. A valve 10 is attached to the distal end of an air passage 9a of the second lid portion 9 which connects the retaining chamber 2 to the outside. As the port of the valve 10 is changed, the use state of the hydrogen tank 1 is switched between a hydrogen discharge state and a hydrogen refilling state.

A hydrogen absorption unit 11 is retained in the retaining chamber 2. The hydrogen absorption unit 11 houses a heating-medium pipe 12 which extends in an axial direction L of the hydrogen tank 1 and is folded back at the distal end side. First and second passage pipes 7a and 7b, which connect the outside of the hydrogen tank 1 with the respective ends of the heating-medium pipe 12, are formed in the first lid portion 7. Cool water or hot water flows inside the heating-medium pipe 12. The first passage pipe 7a is disposed on the upstream side and the second passage pipe 7b is disposed on the downstream side in this embodiment.

A plurality of fins 13 approximately having a disk shape are fixed to the heating-medium pipe 12 at equidistances along the axial direction L of the hydrogen tank 1. A powdery hydrogen absorption alloy is retained between the adjoining fins 13 in contact with the fins 13. The hydrogen absorption alloy has a capability for increasing the amount of hydrogen to be filled in the hydrogen tank 1 and can ensure filling of hydrogen to about 100 times up to 1000 times as great as can be filled with air. A filter 14 (shown by broken lines), which can pass hydrogen while covering all the fins 13, is mounted around the fins 13.

The hydrogen absorption alloy generates heat when absorption hydrogen and absorbs heat when discharging hydrogen. At the time of absorption hydrogen, cool water flows in both passage pipes 7a and 7b and the heating-medium pipe 12 and suppresses a rise in the temperature of the hydrogen absorption alloy via the heating-medium pipe 12 and the fins 13. At the time of discharging hydrogen, on the other hand, hot water flows in both passage pipes 7a and 7b and the heating-medium pipe 12 and suppresses a drop in the temperature of the hydrogen absorption alloy via the heating-medium pipe 12 and the fins 13.

A hole portion 7c which is open to the retaining chamber 2 is formed in the first lid portion 7. An annular projection 15 extending in the circumferential direction is formed on the inner surface of the liner 3 which is a part of the inner surface of the body portion 5 and is located on the distal end side of the hydrogen tank 1 in the axial direction L. The proximal end side of the hydrogen absorption unit 11 is fitted in the hole portion 7c and the distal end side is retained in the retaining chamber 2 while being supported by the annular projection 15.

Figure 2:
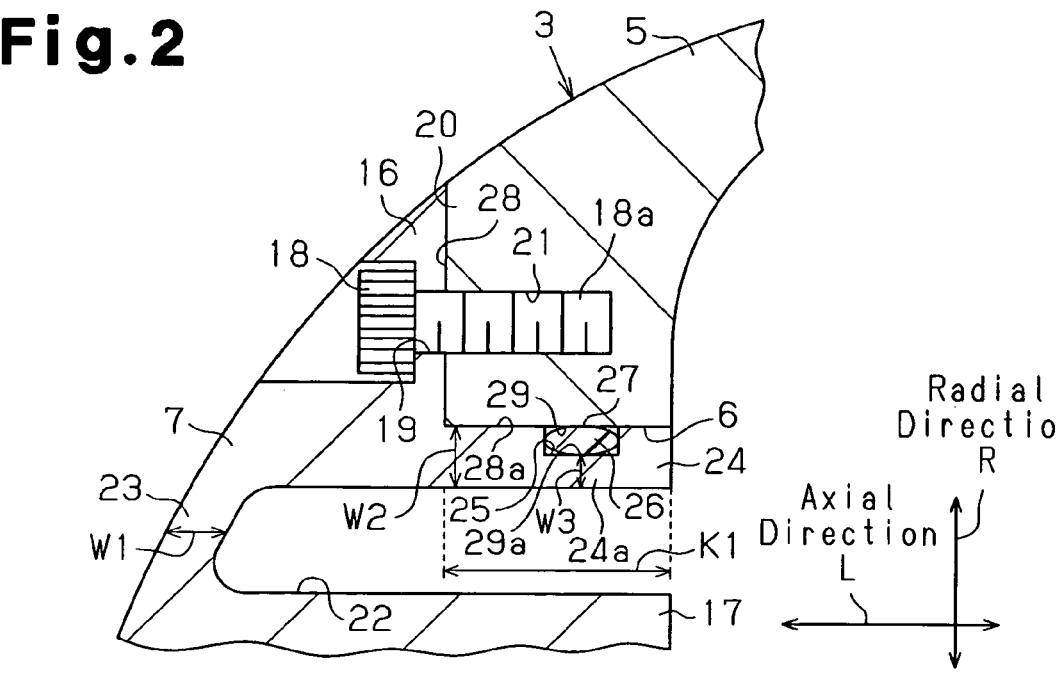
FIG. 2 is a partial cross-sectional view of a juncture portion of a lid on the proximal-end side of the hydrogen tank in FIG. 1.

FIG. 2 is a partial cross-sectional view of a juncture portion between the body portion 5 and the first lid portion 7. Formed on the outer surface of the first lid portion 7 is a flange 16 extending in the circumferential direction. Formed on the inner surface of the first lid portion 7 is a protruding portion 17 having an approximately columnar shape extending approximately in the vertical direction with respect to the flange 16. The outside diameter of the protruding portion 17 is smaller than the outside diameter of the first lid portion 7 including the flange 16. The hole portion 7c is formed in the protruding portion 17.

A plurality of through holes 19 are formed in the flange 16 at predetermined intervals along the circumferential direction of the body portion 5. Each through hole 19 permits insertion of an associated bolt 18. A plurality of female screws 21 are formed on a proximal end 20 of the body portion 5. Each female screw 21 is formed at a position corresponding to the associated through hole 19. With the bolts 18 inserted into the through holes 19 of the flange 16, engaging shaft portions 18a of the bolts 18 with the respective female screws 21 secures the first lid portion 7 to the body portion 5.

An annular groove 22 extending in the circumferential direction of the body portion 5 is formed in the inner surface of the first lid portion 7. The annular groove 22 is positioned outward in the radial direction than the protruding portion 17. The depth of the annular groove 22 in the axial direction L reaches a position at which the thickness of a portion where the bottom of the groove is formed (thin portion 23), becomes smaller than that of the other portion. A bendable portion 24 is formed between the annular groove 22 and the body portion 5 in the radial direction R. The thin portion 23 has a thickness W1 and is deformable along the axial direction L when the pressure in the hydrogen tank 1 is high. According to the embodiment, the thin portion 23 and the bendable portion 24 constitute a deformable portion.

A retaining groove 25 extending in the circumferential direction of the first lid portion 7 is formed in the bendable portion 24. The bottom of the retaining groove 25 faces a seal surface 29 of the opening portion 6 of the body portion 5. The retaining groove 25 is positioned closer to the distal end (rightward in FIG. 2) than the intermediate point of a projection length K1 of the bendable portion 24 in the axial direction L. An O-ring 26 is provided in the retaining groove 25 as a seal member. The O-ring 26 seals between the body portion 5 and the first lid portion 7 by means of a seal portion 27. The bendable portion 24 has a thickness W2 in the radial direction R and is deformable when the pressure in the hydrogen tank 1 is high. The bendable portion 24 has a thin portion 24a at a portion corresponding to the retaining groove 25. As the thin portion 24a has a thickness W3 smaller than the thickness W2 of the portion other than the thin portion 24a, the thin portion 24a is easier to bend.

With the first lid portion 7 attached to the body portion 5, the bendable portion 24 is fitted in the proximal-end side opening portion 6 of the body portion 5 and the flange 16 contacts the proximal end 20 of the body portion 5. The portion where the opening portion 6 and the bendable portion 24 abut on each other and the portion where the proximal end 20 and the flange 16 abut on each other correspond to the contact surface 28 of the body portion 5. The portion of the first lid portion 7 which contacts the contact surface 28 of the body portion 5 corresponds to the contact surface 28a. That is, the body portion 5 and the first lid portion 7 respectively have the contact surfaces 28 and 28a facing each other around the opening portion 6. Two portions of the contact surface 28 of the body portion 5 and the contact surface 28a of the first lid portion 7 on which the opening portion 6 and the bendable portion 24 abut serve as seal surfaces 29 and 29a respectively. As both seal surfaces 29 and 29a extend along the axial direction L of the liner 3, the seal structure of the first lid portion 7 including the seal surfaces 29 and 29a is an axial seal. The thin portion 23 is positioned inward of both seal surfaces 29 and 29a (downward in FIG. 2) in the radial direction R.

Figure 3:
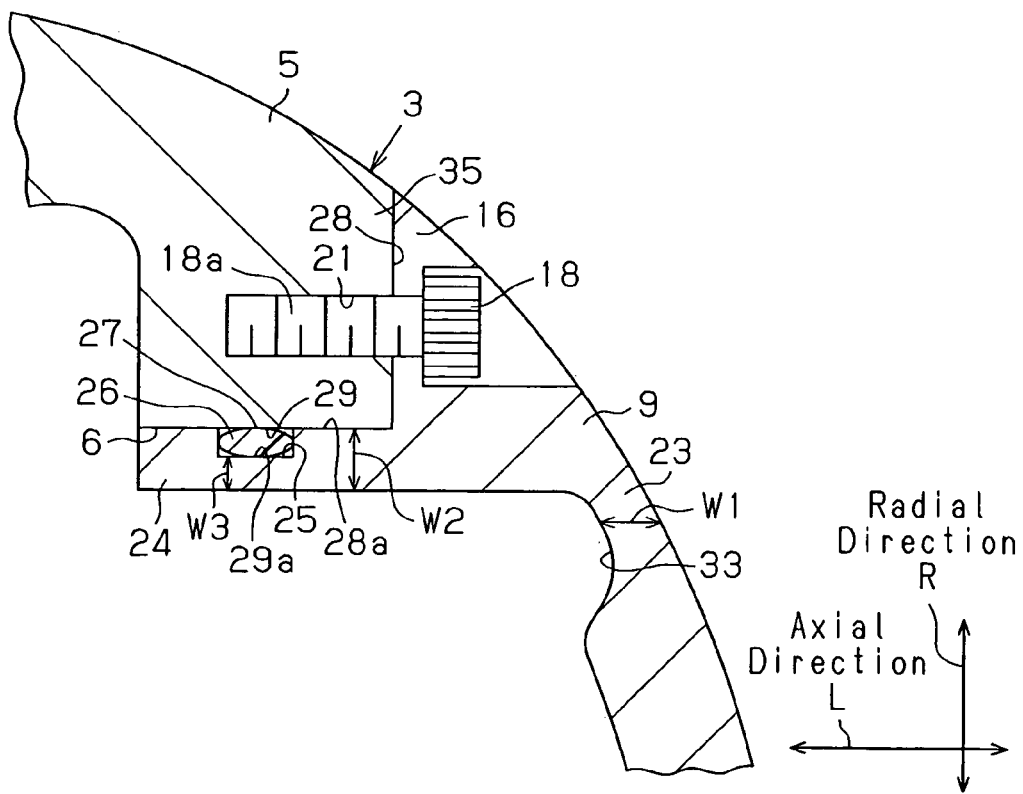
FIG. 3 is a partial cross-sectional view of a juncture portion of a lid on the distal-end side of the hydrogen tank in FIG. 1.

FIG. 3 is a cross-sectional view of the juncture portion of the body portion 5 and the second lid portion 9. Since the essential portions (shape, size and so forth) of the juncture portion of the body portion 5 and the second lid portion 9 are approximately the same as those of the juncture portion of the first lid portion 7 and the body portion 5 in FIG. 2, their descriptions will be omitted and only the different portions will be discussed below.

An annular groove 33 extending in the circumferential direction of the second lid portion 9 is formed in the base portion of the bendable portion 24 in the inner surface of the second lid portion 9 which approximately has a bowl shape. The depth of the annular groove 33 in the axial direction L is less than the depth of the annular groove 22 of the first lid portion 7 in FIG. 2 in the same direction. With the annular groove 33 formed, a thin portion 23 having the same thickness W1 as the thin portion 23 formed on the first lid portion 7 in FIG. 2 is formed on the second lid portion 9.

The following discusses the action of the hydrogen tank 1 with the above-described structure.

In the case where hydrogen is filled or refilled in the hydrogen tank 1, for example, the internal pressure of the retaining chamber 2 becomes high, causing pressure to act on the inner surface of the liner 3. Accordingly, pressure directed outward in the radial direction (the direction of the arrows A in FIG. 4) acts on the inner surface of the body portion 5, so that the body portion 5 is expanded outward in the radial direction along the direction of the arrows A as indicated by a two-dot chain line in FIG. 4. Under this high pressure state, pressure in the direction of the arrows B act on the inner surface of the bendable portion 24 as well as the inner surface of the body portion 5.

Figure 4:
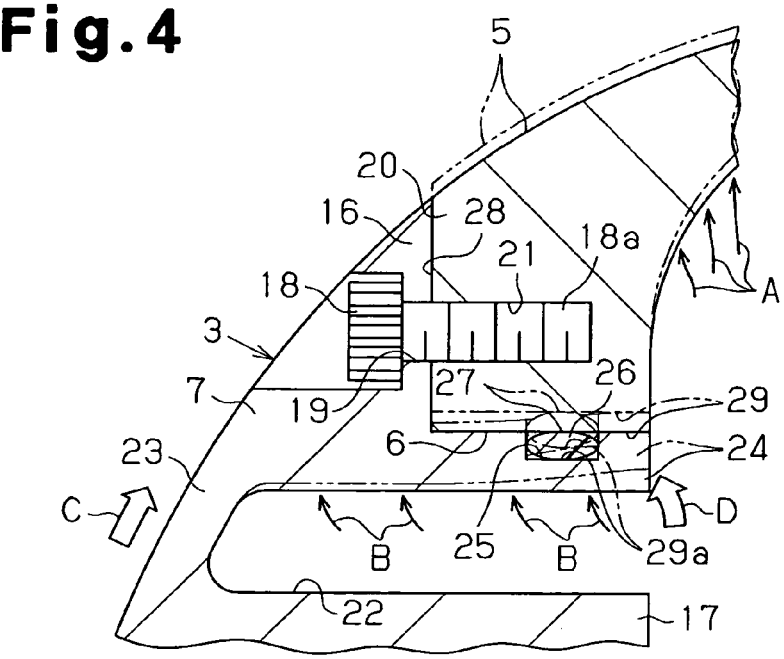
FIG. 4 is a diagram for explaining the action of the hydrogen tank in FIG. 2.

At the same time as the body portion 5 expands, the thin portion 23 extends in the direction of the arrow C and the bendable portion 24 enters the state indicated by the two-dot chain line in FIG. 4 in which the bendable portion 24 is bent in the direction of the arrow D. Particularly, the bendable portion 24 becomes greatly bent at the thin portion 24a. Therefore, the seal portion 27 of the O-ring 26 follows the expansion of the body portion 5 to thereby securely seal between the first lid portion 7 and the body portion 5 even when the internal pressure of the hydrogen tank 1 becomes high. With regard to the second lid portion 9, the seal portion 27 likewise follows the expansion of the body portion 5 due to the extension of the thin portion 23 and the bending of the bendable portion 24. This securely seals between the second lid portion 9 and the body portion 5, thereby ensuring the airtightness of the retaining chamber 2.

The embodiment has the following advantages.

The formation of the annular groove 22 in the first lid portion 7 provides the thin portion 23 and the bendable portion 24, and the formation of the annular groove 33 in the second lid portion 9 provides the thin portion 23. Even when the body portion 5 expands outward in the radial direction by the pressure inside the hydrogen tank 1, for example, the seal portion 27 follows the expansion of the body portion 5 due to the extension of the thin portion 23 and the bending of the bendable portion 24. This makes it possible to securely seal the separate type hydrogen tank 1.

Because the pressure inside the retaining chamber of a hydrogen tank becomes extremely high, the retaining chamber of a hydrogen tank is conventionally made of a metal, such as iron or stainless steel from the viewpoints of the required pressure resistance and the structure. The use of such a metal however makes the hydrogen tank heavier. To reduce the weight, therefore, the first embodiment employs the hydrogen tank 1 using the high-strength CFRP layer 4. The use of the seal structure of the embodiment in the hydrogen tank 1 can adequately seal the separated portions even if the tank is a separable type. It is therefore possible to provide the hydrogen tank 1 which is made lighter while maintaining sufficient sealing capability.

The individual seal structures between the first lid portion 7 and the second lid portion 9 and the body portion 5 are so designed as to seal gas leakage associated with the axial direction of the hydrogen tank 1. This eliminates the need for a structure that seals gas leakage associated with the radial direction of the hydrogen tank 1 and can prevent the hydrogen tank 1 from becoming larger in the radial direction. In the case where the first lid portion 7 and the second lid portion 9 are attached to the body portion 5 by the associated bolts 18, the bolts 18 are disposed in parallel to the axial direction of the liner 3. A thick portion for retaining the shaft portion 18a of the bolt 18 is present at each end portion of the body portion 5. This portion is used for the seal surface 29, thus making it unnecessary to additionally provide a portion for the provision of the seal surface.

As the thin portion 23 and the bendable portion 24 can be provided by respectively forming the annular grooves 22 and 33 in the first lid portion 7 and the second lid portion 9, the thin portion 23 and the bendable portion 24 can be constructed by simple processing work. Further, the annular grooves 22 and 33 can make the required amounts of the lightening portions of the first lid portion 7 and the second lid portion 9 relatively small and can thus maintain adequate strength for the liner 3.

Both sides of the liner 3 are separable. This facilitates processing of the interior of the liner 3 from both sides of the liner 3; for example, it is easier to process the annular projection 15 formed on the distal end side of the inner surface of the body portion 5.

The annular projection 15 is formed on the distal end side of the inner surface of the liner 3. Therefore, the proximal end side of the hydrogen absorption unit 11 is fitted into the hole portion 7c of the first lid portion 7 and the distal end side is supported in engagement with the annular projection 15, so that the hydrogen absorption unit 11 is supported at plural locations in the axial direction L. This makes it possible to suppress vibration and positional deviation of the hydrogen absorption unit 11 in the retaining chamber 2.

The liner 3 is a separable type, so that the liner 3 retaining the hydrogen absorption unit 11 can be manufactured more easily as compared with the case of using a spinning process.

When the internal pressure of the liner 3 is high, the pressure applied to the first lid portion 7 and the second lid portion 9 acts on both the thin portion 23 and the bendable portion 24. Therefore, the stress that is applied when the liner 3 follows the expansion of the body portion 5 and deforms is dispersed at two locations, thus ensuring the durability of the thin portion 23 and the bendable portion 24.

The hydrogen absorption unit 11 is housed in the retaining chamber 2 of the liner 3. This structure can permit a greater amount of hydrogen to be filled in the retaining chamber 2 of the hydrogen tank 1 as compared with the case where the hydrogen absorption unit 11 is not provided.

A second embodiment is described below referring to FIGS. 5 and 6. This embodiment differs from the first embodiment in FIGS. 1 to 4 in the seal structure and is identical in the structures of the other portions. Therefore, the same symbols are given to the same portions to avoid repeating detailed descriptions thereof and only the different portions will be discussed.

Figure 5:
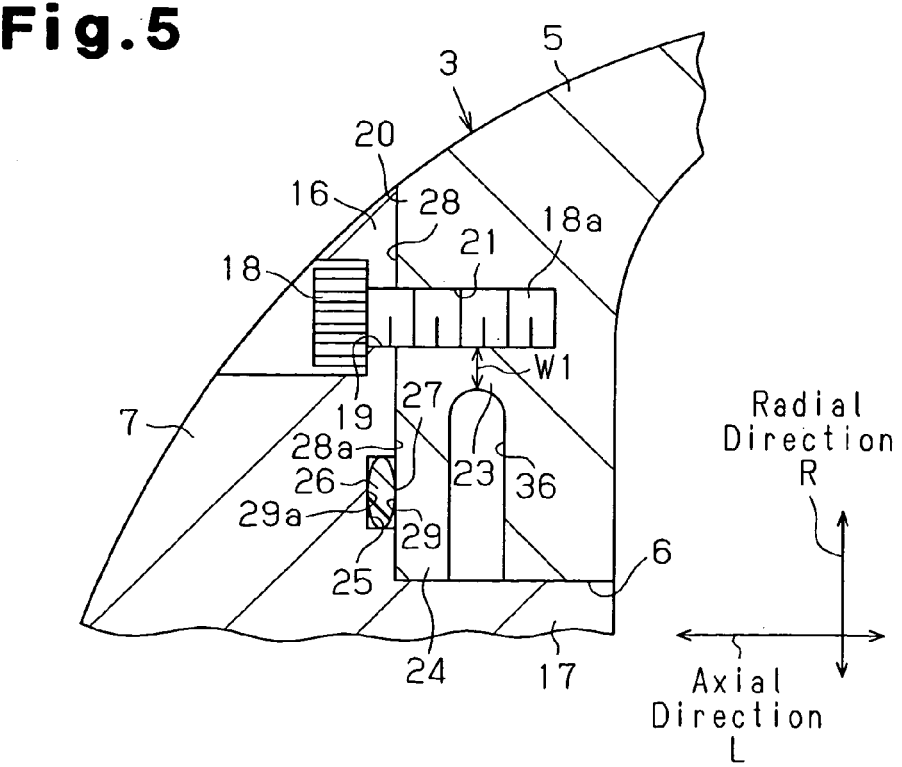
FIG. 5 is a partial cross-sectional view of a juncture portion of a lid on the proximal-end side of a hydrogen tank according to a second embodiment of the present invention.
Figure 6:
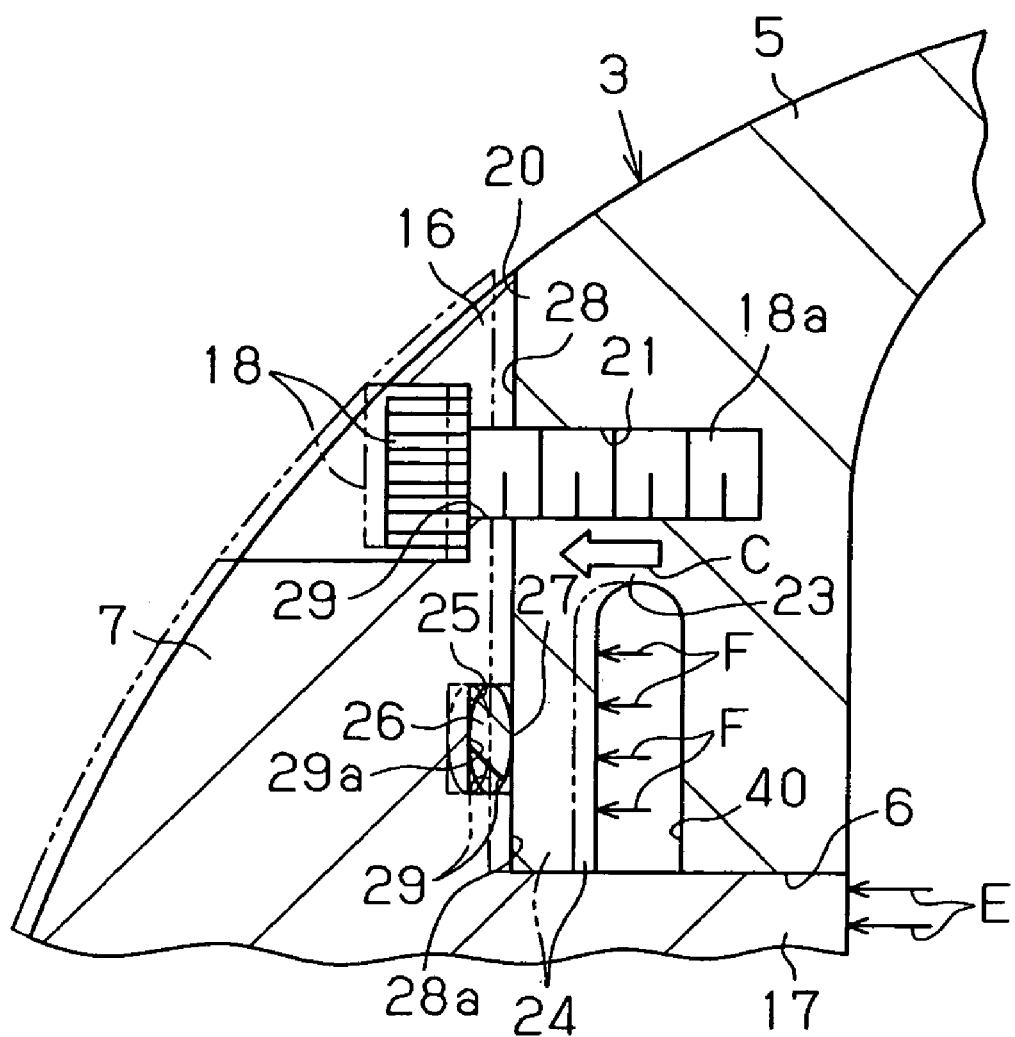
FIG. 6 is a diagram for explaining the action of the hydrogen tank in FIG. 5.

FIG. 5 is a cross-sectional view of the juncture portion of a body portion 5 and a first lid portion 7. An annular groove 36 extending in the circumferential direction is formed in the opening portion 6 of the body portion 5. The annular groove 36 is positioned near the end portion of the body portion 5 in the axial direction L. Forming the annular groove 36 forms a thin portion 23 at the bottom of the annular groove 36 and a bendable portion 24 between the annular groove 36 and a flange 16.

With regard to the axial direction L of the hydrogen tank 1, a retaining groove 25 extending in the circumferential direction is formed in the first lid portion 7 between the first lid portion 7 and the bendable portion 24. The retaining groove 25 is positioned inward of a through hole 19 of a bolt 18 in the radial direction. An O-ring 26 is attached to the retaining groove 25. The seal portion 27 of the O-ring 26 reliably seals between the body portion 5 and the first lid portion 7.

The portion where the opening portion 6 of the body portion 5 abuts on the protruding portion 17 and the portion where the proximal end 20 (including the bendable portion 24) abuts on the flange 16 correspond to the contact surface 28 of the body portion 5. The portion of the first lid portion 7 which contacts the contact surface 28 of the body portion 5 corresponds to the contact surface 28a. Those portions of the contact surface 28 of the body portion 5 and the contact surface 28a of the first lid portion 7 where the proximal end 20 and the flange 16, which are approximately parallel to the radial direction R, abut on each other and serve as seal surfaces 29 and 29a respectively. As the seal surfaces 29 and 29a extend along the radial direction R of the liner 3, the seal structure of the first lid portion 7 including both seal surfaces 29 and 29a is surface sealing. The thin portion 23 is positioned inward of the seal surfaces 29 and 29a in the axial direction. The juncture structure (shape, size, seal structure, etc.) between the body portion 5 and the second lid portion 9, though not illustrated, take the same structure as that for the first lid portion 7.

In the case where hydrogen is filled or refilled in the hydrogen tank 1, for example, the internal pressure of the retaining chamber 2 becomes high, causing pressure to act on the inner surface of the liner 3. Accordingly, pressure directed outward in the axial direction (the direction of the arrows E in FIG. 6) acts on the inner surface of the first lid portion 7, so that the first lid portion 7 is expanded outward in the axial direction as indicated by a two-dot chain line in FIG. 6. Under this high pressure state, pressure in the direction of the arrows F also acts on the inner surface of the bendable portion 24 through the clearance between the protruding portion 17 of the first lid portion 7 and the opening portion 6 of the body portion 5.

At this time, at the same time as the first lid portion 7 moves outward in the axial direction, the thin portion 23 extends in the direction of the arrow C parallel to the axial direction L together with the extension of the shaft portion 18a of the bolt 18. Therefore, the seal portion 27 of the O-ring 26 follows the movement of the first lid portion 7 to thereby reliably seal between the first lid portion 7 and the body portion 5 even when the internal pressure of the hydrogen tank 1 becomes high. With regard to the second lid portion 9, as the seal portion 27 likewise follows the movement of the second lid portion 9 due to the extension of the thin portion 23, the space between the second lid portion 9 and the body portion 5 is securely sealed, thereby ensuring the airtightness of the retaining chamber 2.

The embodiment has the following advantages in addition to advantages which are almost the same as those of the embodiment in FIGS. 1 to 4.

Even when the internal pressure of the hydrogen tank 1 becomes high and the first lid portion 7 (second lid portion 9) moves along the axial direction L, the seal portion 27 follows the movement of the first lid portion 7 (second lid portion 9) due to the extension of the thin portion 23 to be thereby able to securely seal the hydrogen tank 1 even if the hydrogen tank 1 is designed as a separable type.

The individual seal structures between the first lid portion 7 and the second lid portion 9 and the body portion 5 are so designed as to seal gas leakage associated with the radial direction of the hydrogen tank 1. This eliminates the need for a structure that seals gas leakage associated with the axial direction of the hydrogen tank 1 and prevents the hydrogen tank 1 from becoming larger in the axial direction.

A hydrogen tank 111 according to a third embodiment is described below referring to FIGS. 7 and 8. This embodiment differs from the first embodiment in FIGS. 1 to 4 in the structure of a part of the liner 3 and the seal structure and is identical in the structures of the other portions. Therefore, the same symbols are given to the same portions to avoid repeating detailed descriptions thereof and only the different portions will be discussed.

Figure 7:
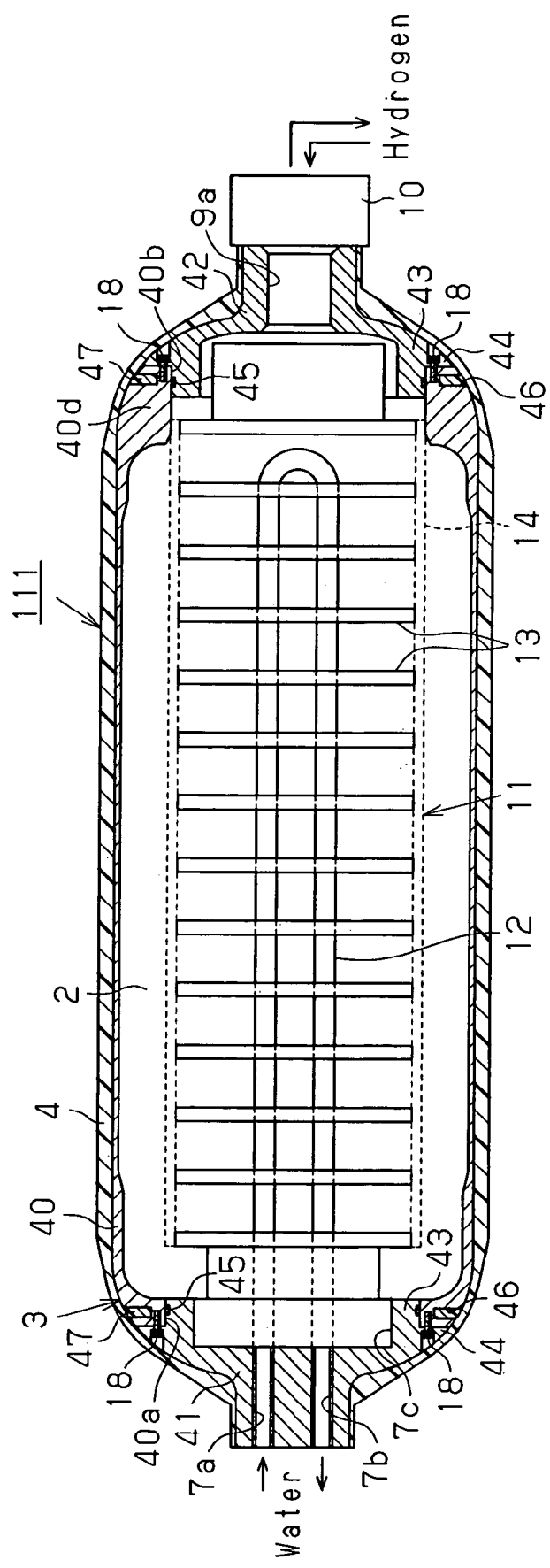
FIG. 7 is a cross-sectional view of a hydrogen tank according to a third embodiment of the invention.

As shown in FIG. 7, a liner 3 has both ends designed as a separable type and has an approximately cylindrical body portion 40, a first lid portion 41 which covers a proximal-end side opening portion 40a of the body portion 40 and a second lid portion 42 which covers a distal-end side opening portion 40b of the body portion 40. The proximal-end side opening portion 40a has a circular cross section and has its diameter set large enough to permit the passage of the hydrogen absorption unit 11.

Figure 8:
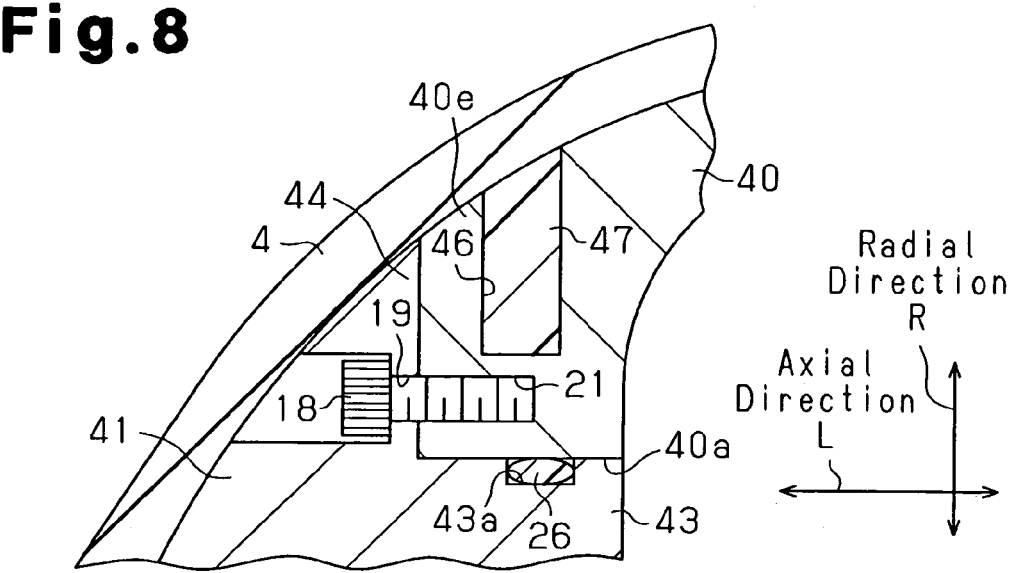
FIG. 8 is an enlarged view of a part of the hydrogen tank in FIG. 7.

As shown in FIGS. 7 and 8, the first lid portion 41 has a protruding portion 43 to be inserted into the opening portion 40a and a flange 44 larger in diameter than the protruding portion 43. The protruding portion 43 has an approximately columnar shape with the O-ring 26 located between the peripheral surface of the protruding portion 43 and the peripheral surface of the opening portion 40a. The O-ring 26 is retained in an annular retaining groove 43a formed in the peripheral surface of the protruding portion 43. Pressed and deformed by the bottom side of the retaining groove 43a and the peripheral surface of the opening portion 40a, the O-ring 26 seals between the body portion 40 and the first lid portion 41, i.e., the separated portions of the liner 3.

The hole portion 7c which is open to the retaining chamber 2 is formed in the first lid portion 41. The proximal end of the hydrogen absorption unit 11 is fitted in the hole portion 7c and the distal end of the hydrogen absorption unit 11 is retained in the retaining chamber 2 while being supported by a distal end portion 40d of the body portion 40.

An annular groove 46 is provided on the outer surface of the liner 3 as an annular recess along the circumferential direction. The annular groove 46 is open to the outside of the body portion 40 in the radial direction. The annular groove 46 is located outward of the positions of the female screws 21 in the radial direction. An annular reinforcing portion 47 for prevention of enlargement of the opening portion 40a is provided in the annular groove 46. The annular reinforcing portion 47 is comprised of the same fiber reinforced resin as used for the bundle of reinforced fibers of the high-strength CFRP layer 4 that covers the outer surface of the liner 3. The depth and width of the annular groove 46 are set to values in the range in which expansion (enlargement) of a proximal end portion 40e of the body portion 40 associated with the radial direction R can be restrained so that under high internal pressure in the hydrogen tank 111, the O-ring 26 can reliably seal between the first lid portion 41 and the body portion 40. Since the seal structure formed at the second lid portion 42 and the distal end portion 40d of the body portion 40 is the same as the seal structure formed at the first lid portion 41 and the proximal end portion 40e of the body portion 40, its description will be omitted.

The following discusses a method of manufacturing the thus constituted hydrogen tank 111. At the time of manufacturing the hydrogen tank 111, first, the hydrogen absorption unit 11 is mounted to the first lid portion 41 which is attached to the body portion 40 by the bolts 18 in such a way as to block the proximal-end side opening portion 40a. Next, the second lid portion 42 is attached to the body portion 40 by the bolts 18 in such a way as to block the opening portion 40b on the other end side, thereby preparing the liner 3 housing the hydrogen absorption unit 11. The liner 3 is set in an unillustrated filament winding apparatus and a bundle of resin-impregnated fibers is wound in both annular grooves 46 of the first and second lids 41 and 42 by a preset amount. This amount of winding is the amount retainable in the annular groove 46. The bundle of resin-impregnated fibers wound in each annular groove 46 constitutes the annular reinforcing portion 47 when being subjected to later heat curing.

After winding of the bundle of resin-impregnated fibers in both annular grooves 46 is completed, filament winding is carried out by the filament winding apparatus until the bundle of resin-impregnated fibers is wound around the outer surface of the liner 3 until predetermined numbers of helical winding layers and hoop winding layers are formed. The hoop winding layers are formed mainly on the cylindrical portion (body portion) of the liner 3. Next, the liner 3 with the bundle of resin-impregnated fibers wound around is removed from the filament winding apparatus and placed in a heating furnace to thermally cure the resin. Then, a variation or the like is removed after which the valve 10 is attached to the second lid portion 42, thereby completing the hydrogen tank 111.

The description of the action of the thus constituted hydrogen tank 111 is given of the case where the hydrogen tank 111 is used in a fuel-cell mounted electric vehicle.

When a hydrogen gas is used at the fuel electrode with the valve 10 held in the hydrogen discharge state, the hydrogen gas is discharged from the hydrogen tank 111 via the valve 10 and is supplied to the fuel electrode. When the hydrogen gas is discharged from inside the hydrogen tank 111, the hydrogen gas is discharged from the hydrogen absorption alloy. As the discharge of hydrogen is a heat endoergic reaction, if the heat needed for hydrogen discharge is not supplied by the heating medium, the sensible heat of the hydrogen absorption alloy itself is consumed to discharge hydrogen. This reduces the temperature of the hydrogen absorption alloy. As the temperature of the hydrogen absorption alloy falls, the reaction speed of hydrogen discharge is reduced. At the time of discharging hydrogen, however, hot water flows to the heating-medium pipe 12 via the first and second passage pipes 7a and 7b and suppresses the temperature drop of the hydrogen absorption alloy via the heating-medium pipe 12 and the fins 13, so that reaction of hydrogen discharge progresses smoothly. The hydrogen discharged from the hydrogen absorption alloy is discharged out of the hydrogen tank 111 via the valve 10 and supplied to the fuel electrode.

In the case where the hydrogen gas is filled again in the hydrogen tank 111 from which hydrogen has been discharged, i.e., when the hydrogen gas is absorbed in the hydrogen absorption alloy, the valve 10 is switched to the hydrogen filling state to supply the hydrogen gas into the hydrogen tank 111 via the valve 10. The supplied hydrogen gas reacts with the hydrogen absorption alloy to become hydride and is absorbed in the hydrogen absorption alloy. As the hydrogen absorption reaction is a heat generating reaction, the heat absorption reaction cannot progress smoothly unless the heat generated by the hydrogen absorption reaction is removed. At the time of filling the hydrogen gas, however, cool water flows to the heating-medium pipe 12 via both passage pipes 7a and 7b and suppresses the temperature rise of the hydrogen absorption alloy via the heating-medium pipe 12 and the fins 13, thereby ensuring efficient absorption of the hydrogen gas.

In the case where the pressure in the hydrogen tank 111 is higher than the external pressure, pressure to expand the liner 3 is applied to the inner surface of the liner 3. Immediately after the hydrogen gas is filled or refilled, the pressure in the hydrogen tank 111 is high and the force to increase the diameters of the individual opening portions 40a and 40b or the force to expand the opening portions 40a and 40b in the radial direction acts on the body portion 40. If the high-strength CFRP layer 4 alone works against this force, it is difficult to suppress the expansion because there are few hoop winding layers at the portion of the high-strength CFRP layer 4 at the positions corresponding to the opening portions 40a and 40b. However, the existence of the annular reinforcing portion 47 on the outer surface of the body portion 40 corresponding to the peripheral surface of each opening portions 40a, 40b suppresses the expansion of the opening portion 40a, 40b, so that the O-ring 26 securely seals between the peripheral surface of the protruding portion 43 of the lid portion 41, 42 and the peripheral surface of the opening portion 40a, 40b, thus ensuring the airtight condition of the retaining chamber 2.

The present embodiment has the following advantages.

The liner 3 of the hydrogen tank 111 is separated into the proximal end portion 40e in which the opening portion 40a where an assembly (hydrogen absorption unit 11) is insertable is formed, and the first lid portion 41 which covers the opening portion 40a. The O-ring 26 is located between the peripheral surface of the protruding portion 43 of the first lid portion 41 and the peripheral surface of the proximal end portion 40e. The annular reinforcing portion 47 for preventing enlargement of the opening portion 40a is provided on the outer surface of the liner 3 corresponding to the opening portion 40a. The distal end side of the liner 3 is constructed approximately in a similar manner. Even when the internal pressure of the liner 3 becomes high, therefore, expansion of each opening portion 40a, 40b is restrained by the associated reinforcing portion 47 and the O-ring 26 securely seals between the inside and outside of the liner 3.

The reinforcing portion 47 is provided in the annular groove 46 provided on the outer surface of the liner 3. Therefore, the reinforcing portion 47 does not protrude from the dome portion of the liner 3 so that even the provision of the reinforcing portion 47 does not adversely affect the layout of the bundle of fibers constituting the high-strength CFRP layer 4 and can maintain adequate strength for the high-strength CFRP layer 4.

The annular groove 46 is open in the radial direction and the reinforcing portion 47 is comprised of the fiber reinforced resin having a bundle of reinforced fibers wound annularly. The provision of the reinforcing portion 47 provides an effect equivalent to that obtained by increasing the hoop winding layers at those portions corresponding to the opening portions 40a and 40b. Prior to the formation of the high-strength CFRP layer 4 which covers the outer surface of the liner 3 by filament winding, the reinforcing portion 47 can be formed by winding the bundle of resin-impregnated fibers in the annular groove 46 using the same filament winding apparatus.

The reinforcing portion 47 is made of the same reinforced resin as the fiber reinforced resin that forms the bundle of reinforced fibers of the high-strength CFRP layer 4 that covers the outer surface of the liner 3. At the time of winding the bundle of resin-impregnated fibers constituting the high-strength CFRP layer 4 on the outer surface of the liner 3 housing an assembly (hydrogen absorption unit 11), therefore, the reinforcing portion 47 can be formed by winding the same bundle of resin-impregnated fibers in the annular groove 46 prior to the formation of the high-strength CFRP layer 4. This makes the formation of the reinforcing portion 47 simpler as compared with the case where a bundle of fibers different from the bundle of reinforced fibers of the high-strength CFRP layer 4 is used as reinforced fibers.

The proximal end side of the hydrogen absorption unit 11 is fixed to the first lid portion 41 provided on the proximal end side of the liner 3 and the distal end side of the hydrogen absorption unit 11 is supported while being engaged with the distal end portion 40d of the liner 3. Even if the hydrogen tank 111 vibrates, therefore, the hydrogen absorption unit 11 is not easily vibrated or shifted in the retaining chamber 2 with respect to the liner 3.

In the case of a structure where an opening portion is formed only on one end side of the liner and is covered with a lid, for example, a support portion which supports the distal end of the hydrogen absorption unit 11 should be provided on the other end side of the liner by using an unillustrated cutting tool inserted through the opening portion. This results in poor workability. The provision of the opening portions 40a and 40b respectively in both end portions of the liner 3 facilitates the work for processing the end portions of the body portion 40.

A hydrogen tank 111 according to a fourth embodiment is described below referring to FIG. 9. This embodiment differs from the third embodiment in FIGS. 7 and 8 in that the reinforcing portion 47 is constructed as fittable from the axial direction of the liner 3 and is identical to the latter embodiment in the structures of the other portions. Therefore, the same symbols are given to those portions which are similar to the corresponding portions of the embodiment in FIGS. 7 and 8 to avoid repeating detailed descriptions thereof.

Figure 9:
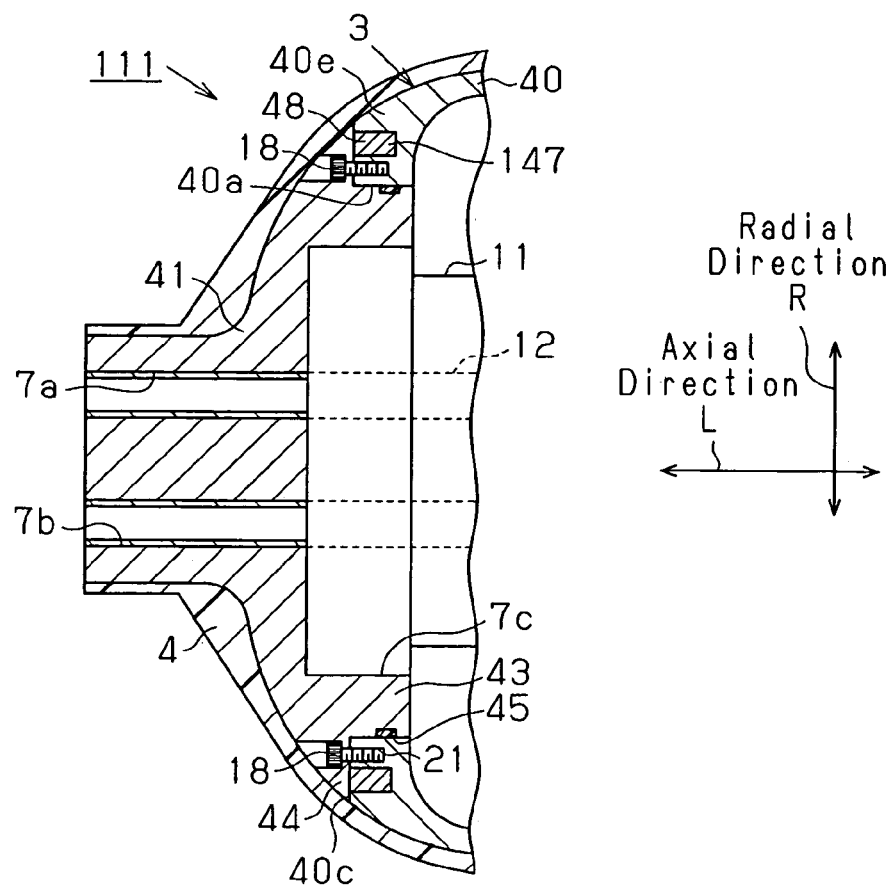
FIG. 9 is a partial cross-sectional view of a hydrogen tank according to a fourth embodiment of the present invention.

As shown in FIG. 9, an annular groove 48 is formed in an end face 40c of the body portion 40 as an annular recess along the circumferential direction. The annular groove 48 is positioned outward of the positions of the bolts 18 in the radial direction. A reinforcing portion 147 is provided in the annular groove 48. The reinforcing portion 147 is made of a material whose rigidity is higher than that of the material for the liner 3; stainless steel is used for the reinforcing portion 147 in this embodiment. The reinforcing portion 147 is formed by punching out a stainless steel plate material by pressing. The thickness and cross-sectional area of the reinforcing portion 147 are set to values within a range where expansion (enlargement) of the opening portion 40a is securely sealed by the O-ring 26. The depth and width of the annular groove 48 are set to such values as to be able to retain the reinforcing portion 147. The reinforcing portion 147 is retained in the annular groove 48 while its inner surface is fitted in the annular groove 48. The annular groove 48 is covered with the flange 44 of the first lid portion 41.

An annular groove 48 similar to that of the first lid portion 41 is formed in the distal end portion 40d of the body portion 40 corresponding to the second lid portion 42. A reinforcing portion 147 is likewise retained in the annular groove 48 of the distal end portion 40d.

In the case of manufacturing the hydrogen tank 111, both reinforcing portions 147 are retained in the respective annular grooves 48 before both lid portions 41 and 42 are secured to the body portion 40. After the bundle of resin-impregnated fibers is wound on the liner 3 housing the hydrogen absorption unit 11 inside by the filament winding apparatus, the resin is cured in a heating furnace to form the high-strength CFRP layer 4 after which the valve 10 is attached.

In the case where the reinforcing portion 47 is provided on the annular groove 46 as done in the embodiment in FIGS. 7 and 8, the reinforcing portion 47 should be formed by curing the resin after winding the bundle of resin-impregnated fibers, or filling the resin and curing it or winding metal wires after a bundle of fibers is wound. That is, winding of wire materials is needed. Therefore, attachment of the reinforcing portion 47 to the liner 3 is not easy. In the embodiment in FIG. 9, by way of contrast, the metal reinforcing portion 147 can be attached to the body portion 40 easily from the axial direction of the liner 3, leading to an improved working efficiency.

Even when the internal pressure of the liner 3 becomes high in the hydrogen tank 111 of the fourth embodiment, expansion of the opening portions 40a and 40b is restrained by the reinforcing portions 147.

The fourth embodiment has the following advantages in addition to the advantages of the third embodiment in FIGS. 7 and 8.

The annular groove 48 is open outward in the axial direction of the liner 3. Unlike in the case of the embodiment in FIGS. 7 and 8 which is provided with the annular groove 46 open outward in the radial direction of the liner 3, the reinforcing portion 147 can be attached easily in the annular groove 48.

The reinforcing portion 147 is formed by punching out a metal plate by pressing. The fabrication of the reinforcing portion 147 is therefore easier than a reinforcing portion formed of a fiber reinforced resin having a bundle of fibers wound annularly as reinforced fibers.

Stainless steel is used as the material for the reinforcing portion 147. In the case where the liner 3 is made of an aluminum alloy, unlike in the case where the reinforcing portion is formed by using another metal such as copper or steel, therefore, a rust prevention process becomes unnecessary.

The embodiments are not limited to those described above, but may be modified, for example, in the following ways.

Figure 10:
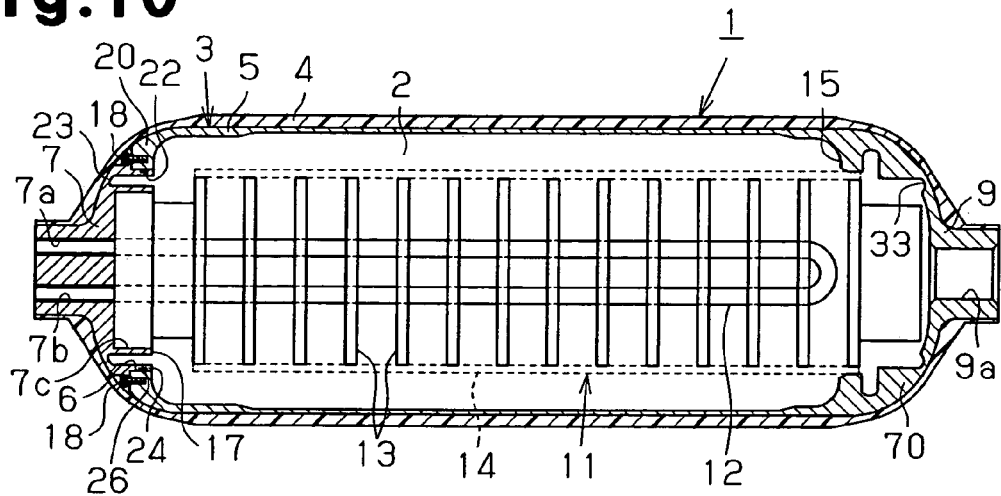
FIG. 10 is a cross-sectional view of a hydrogen tank according to a modified embodiment.
Figure 15:
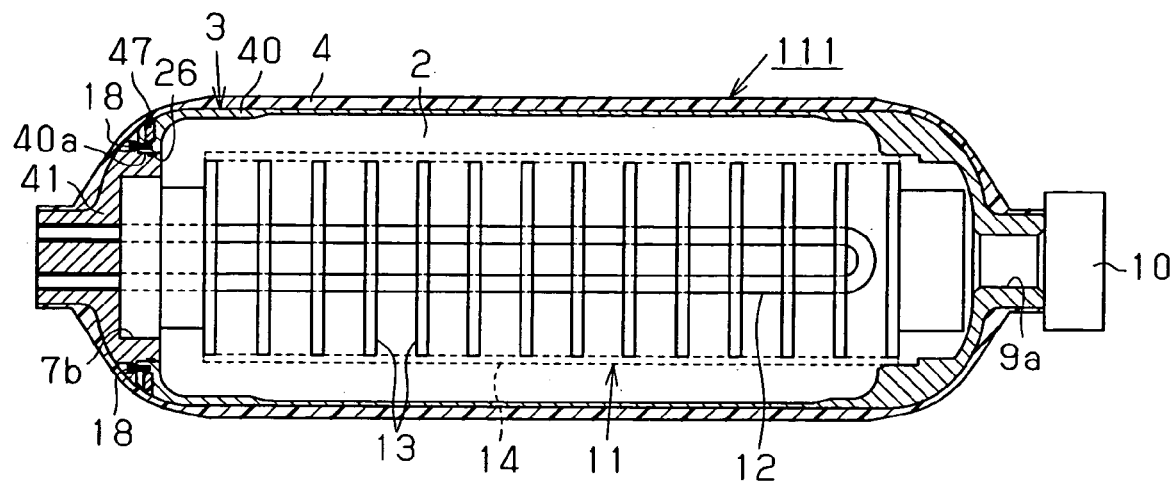
FIG. 15 is a cross-sectional view of a hydrogen tank according to a yet another modified embodiment.

In the individual embodiments in FIGS. 1 to 9, the liner 3 is not limited to a type in which both of its ends are separable. As shown in FIG. 10 or FIG. 15, for example, the distal end portion, 70, of the liner 3 may be formed as an integral part and only the proximal end 20 may be made separable. FIG. 15 shows a modified embodiment of the embodiment in FIGS. 7 and 8. This case reduces the assembly steps of fastening the bolts 18 at the time of assembling the liner 3, thus making the assembly work easier.

Figure 11:
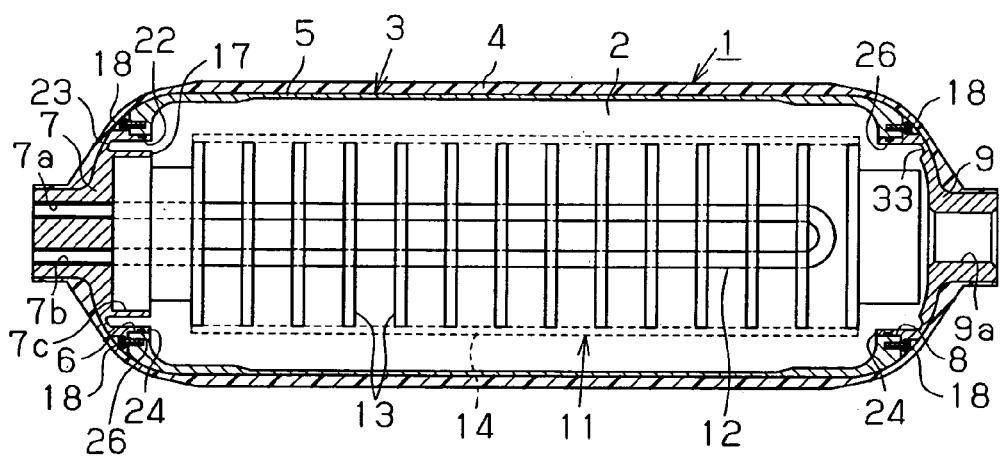
FIG. 11 is a cross-sectional view of a hydrogen tank according to another modified embodiment.

In the individual embodiments in FIGS. 1 to 6, the projection 15, which supports the distal end portion of the hydrogen absorption unit 11, should not necessarily be provided on the distal end side of the inner surface of the liner 3, but may be omitted as shown in FIG. 11.

Figure 12:
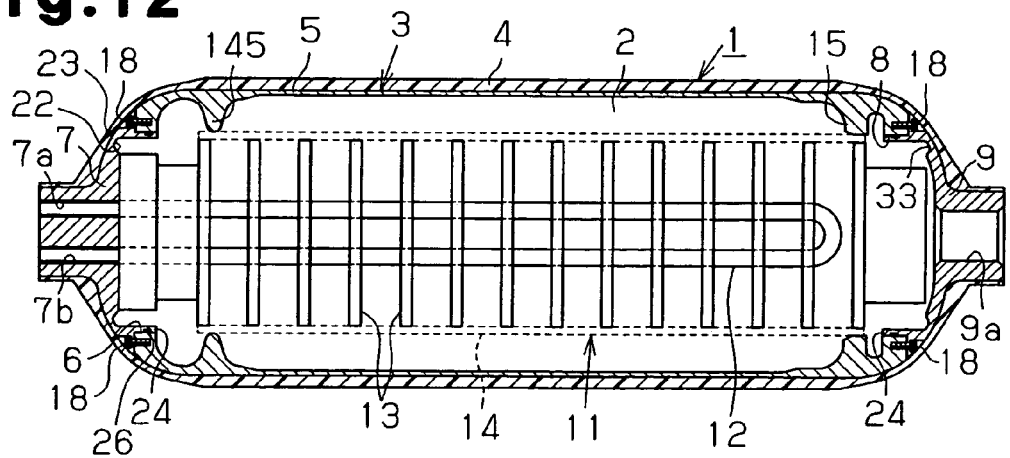
FIG. 12 is a cross-sectional view of a hydrogen tank according to a further modified embodiment.

In the individual embodiments in FIGS. 1 to 6, the scheme for supporting the proximal end side of the hydrogen absorption unit 11 is not limited to the fitting of the proximal end side into the hole portion 7c provided in the protruding portion 17. As shown in FIG. 12, the first lid portion 7 approximately having a bowl shape may be used, and a projection 145 may be provided on the proximal end side of the inner surface of the body portion 5 so that the hydrogen absorption unit 11 is supported by both the projections 15 and 145.

Figure 13:
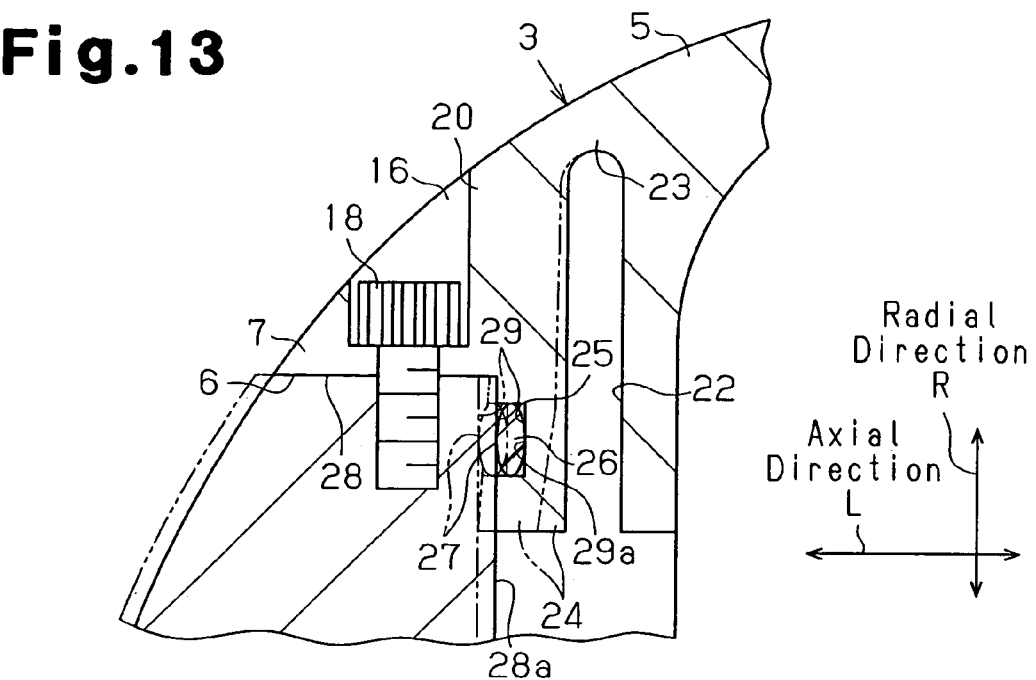
FIG. 13 is a partial cross-sectional view of a juncture portion of a lid on the proximal-end side of a hydrogen tank according to a still further modified embodiment.

In the individual embodiments in FIGS. 1 to 6, the liner 3 may be assembled by fastening the bolts 18 to the first lid portion 7 (second lid portion 9) in the radial direction R from the side portion of the body portion 5 as shown in FIG. 13. In this case, the seal surface 29 may extend along the radial direction R and the annular groove 22 may be formed in the inner surface of the body portion 5 to form the thin portion 23 and the bendable portion 24. In this structure, the seal surface 29 may be so arranged as to extend along the axial direction L.

In the individual embodiments in FIGS. 1 to 6, a rubber member may be provided between the hydrogen absorption unit 11 and the annular projection 15. In this case, positional deviation of the hydrogen absorption unit 11 positioned in the retaining chamber 2 can be made harder.

In the individual embodiments in FIGS. 1 to 6, the thicknesses W1 of the thin portion 23 and the thickness W2 and W3, etc of the bendable portion 24 may be changed and set as needed. Further, the values of the thicknesses W1 to W3 may be so set as to differ between the distal end side and the proximal end side.

In the individual embodiments in FIGS. 1 to 6, the retaining groove 25 of the O-ring 26 should not necessarily be formed in the first lid portion 7 (second lid portion 9), but may be formed in, for example, the body portion 5.

In the individual embodiments in FIGS. 1 to 6, the thin portion 23 and the bendable portion 24 have only to be formed by lightening the liner 3. For example, the thin portion 23 and the bendable portion 24 may be formed by leaving only the portion of the protruding portion 17 of the first lid portion 7 which is near the location of the O-ring 26 and gouging the other integral portion.

In the individual embodiments in FIGS. 1 to 6, the projection which is formed on the inner surface of the body portion 5 is not limited to the annular projection 15 which supports the hydrogen absorption unit 11, but may be a projection having another capability. Processing of the inner surface of the body portion 5 is not limited to the provision of the annular projection 15 but may include processing to provide a recess.

In the embodiment in FIGS. 7 and 8, the reinforcing portion 47 may be comprised of a fiber reinforced resin that uses, as reinforced fibers, a bundle of fibers having a higher strength than the bundle of reinforced fibers of the high-strength CFRP layer 4 which covers the outer surface of the liner 3. In this case, the same strength can be acquired even if the number of windings of the bundle of fibers is reduced, as compared with the case where the bundle of fibers constituting the reinforcing portion 47 has the same strength as the bundle of reinforced fibers of the high-strength CFRP layer 4 which covers the outer surface of the liner 3. Thus, the amount of the bundle of fibers necessary for suppressing the expansion of each opening 40a, 40b can be reduced. This makes it easier to create space for forming the female screw 21 to be engaged with the respective bolts 18, which couple both lid portions 41 and 42 to the body portion 40.

In the embodiment in FIGS. 7 and 8, the depth of the annular groove 46 may be smaller than the width thereof. The bottom of the annular groove 46 may be shaped to be in parallel to the open end of the annular groove 46. The annular groove 46 may have a V-shaped cross section or a U-shaped cross section.

In the embodiment in FIGS. 7 and 8, the bundle of resin-impregnated fibers which constitutes the reinforcing portion 47 need not be filled in the entire annular groove 46; for example, the bundle of resin-impregnated fibers may be filled in the bottom side of the annular groove 46 with space provided on the open side of the annular groove 46 or a resin may be filled there.

In the embodiment in FIGS. 7 and 8, the formation of the reinforcing portion 47 is not limited to winding of the bundle of resin-impregnated fibers by an unillustrated filament winding apparatus immediately before the formation of the high-strength CFRP layer 4, but the body portion 40 having the reinforcing portion 47 formed in the annular groove 46 may be fabricated beforehand and maintained. In the case where the bundle of fibers that constitutes the reinforcing portion 47 differs from the bundle of fibers that constitutes the high-strength CFRP layer 4, particularly, it is preferable that the reinforcing portion 47 be formed beforehand.

In the embodiment in FIGS. 7 and 8, the material for the reinforcing portion 47 is not limited to the fiber reinforced resin. For example, the reinforcing portion 47 may be formed by winding metal wire materials. It is preferable that both ends of metal wire materials should be coupled together to make the winding state hardly loosenable.

Figure 14A:
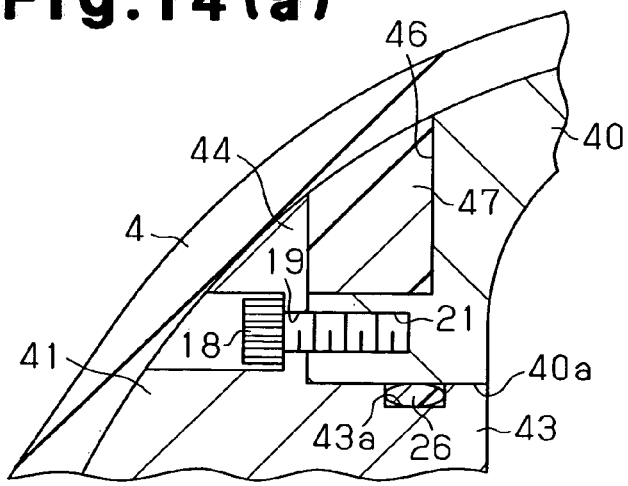
FIG. 14(a) is a partial cross-sectional view of a hydrogen tank according to a yet another modified embodiment.

In the case where the reinforcing portion 47 is wound by the filament winding apparatus prior to the formation of the high-strength CFRP layer 4, one side wall of the annular groove 46 may be constituted by the flange 44 of the first lid portion 41, as shown in FIG. 14(a). That is, the extending portion of the body portion 40 which extends in the radial direction between the annular groove 46 and the flange 44 may be omitted. In this case, the axial-directional width of the annular groove 46 can be set larger.

Figure 14B:
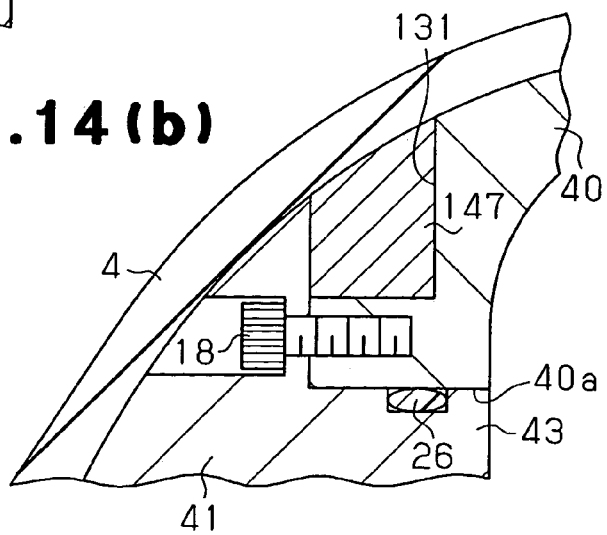
FIG. 14(b) is a partial cross-sectional view of a hydrogen tank according to a yet another modified embodiment.

In the embodiment in FIG. 9, instead of retaining the reinforcing portion 147 in the annular groove 48, an annular cutaway 131 as an annular recess may be provided in the end portion of the body portion 40 so that the reinforcing portion 147 is retained in the annular cutaway 131, as shown in FIG. 14(b). In this case, it is preferable that the outer surface of the reinforcing portion 147 be formed along the curved surface of the high-strength CFRP layer 4.

In the case where the reinforcing portion 147 is fitted in the annular groove 48 or the annular cutaway 131 from the axial direction of the liner 3 as in the embodiment in FIG. 9 or the embodiment in FIG. 14(b), the material for the reinforcing portion 147 is not limited to stainless steel but may be other metals than stainless steel. Further, the material is not limited to a metal but may be a fiber reinforced resin or metal matrix composite (MMC). If the MMC having an aluminum alloy in the form of a matrix and silicon carbide as a reinforced material is used, the rigidity of the reinforcing portion 147 becomes equal to or greater than the rigidity of cast iron with about the same weight as the aluminum alloy.

In the individual embodiments in FIGS. 7 to 9 and FIGS. 14(a) to 15, instead of forming the retaining groove 43a in the protruding portion 43, the retaining groove 43a may be formed in the peripheral surface of each opening portion 40a, 40b.

In the individual embodiments in FIGS. 7 to 9, the protruding portions 43 of both lid portions 41 and 42 are not limited to have a columnar shape extending in parallel to the axial direction of the liner 3 but may have a conical shape which becomes narrower toward the distal end side.

Instead of forming the retaining groove for retaining the O-ring 26 in the protruding portion 43 or in the peripheral surface of that portion which defines the opening portion 40a, 40b, a chamfered portion or a cutaway portion may be provided on the periphery of that end portion of the opening portion 40a, 40b which lies on that side of the lid portion 41, 42. The O-ring 26 may be arranged in the space surrounded by the chamfered portion or cutaway portion and the end face of the flange 44 of the lid portion 41, 42 and the peripheral surface of the proximal end of the protruding portion 43.

The heating-medium pipe 12 may have a shape which is bent plural times instead of a U shape.

The material for the fiber reinforced plastic layer is not limited to carbon fibers but other fibers which are generally said to have high elasticity and high strength, such as glass fibers, silicon carbide ceramic fibers or aramid fibers, may be used as well.

The material for the liner 3 is not limited to an aluminum alloy but other metals may be used as well as long as the airtight condition of the retaining chamber 2 can be obtained. The material for the liner 3 is not limited to a metal but may be a synthetic resin such as polyamide or high-density polyethylene.

In the individual embodiments in FIGS. 1 to 15, the seal member that seals between the lid portion and the associated body portion 5, 40 is not limited to have a circular cross section in an open state where the seal member is not laid out at the seal position, but may have a different shape.

Figure 16:
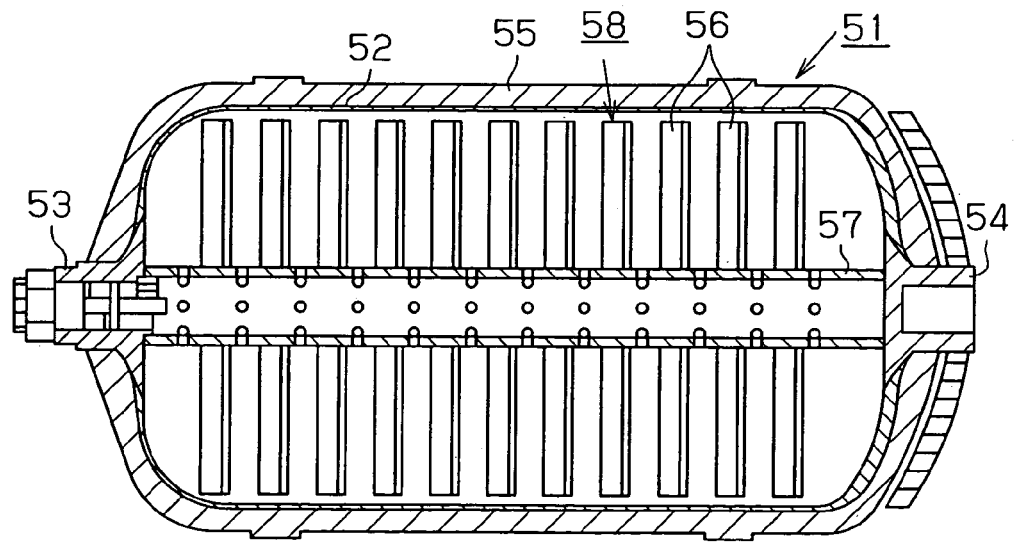
FIG. 16 is an exemplary cross-sectional view of a prior art hydrogen tank.
Figure 17A:
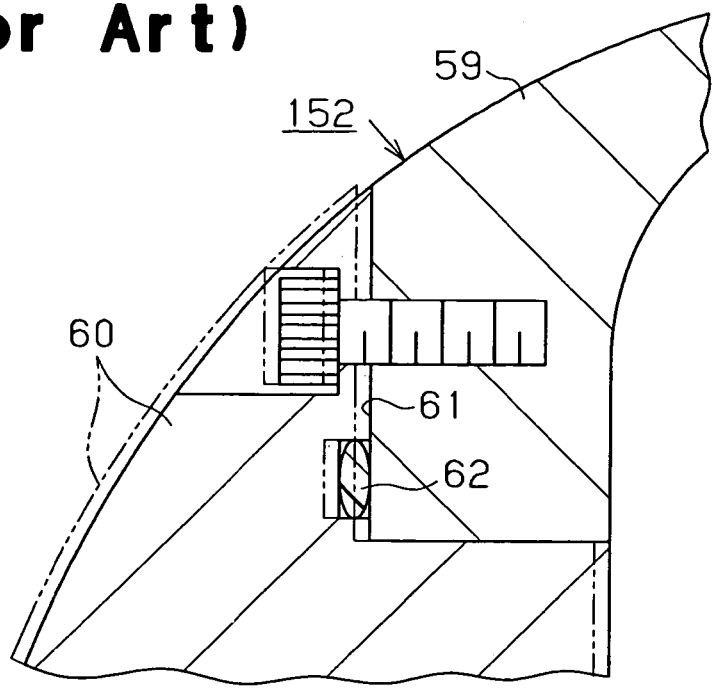
FIG. 17(a) is a cross-sectional view of the juncture portion of a lid of a liner of a prior art hydrogen tank different from the tank in FIG. 16.
Figure 17B:
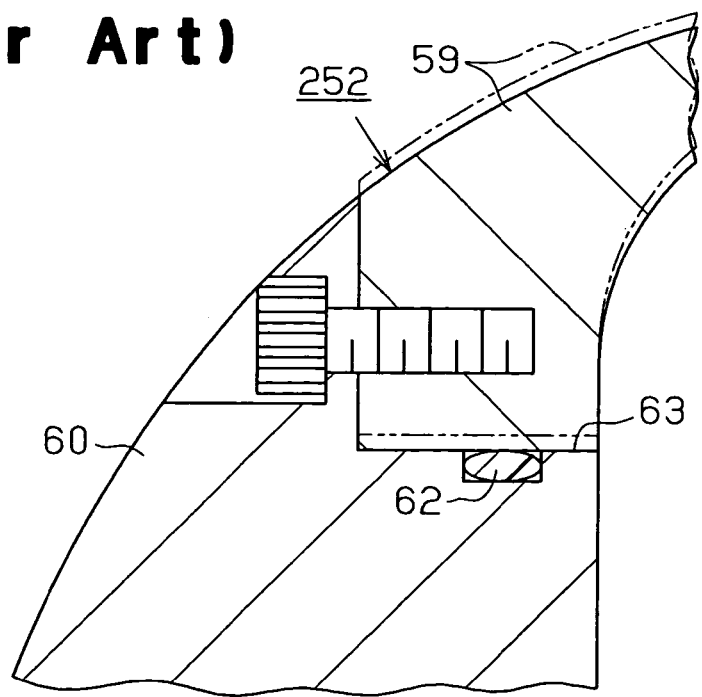
FIG. 17(b) is a cross-sectional view of the juncture portion of a lid of a liner of a prior art hydrogen tank different from the tank in FIG. 17(a).

In the individual embodiments in FIGS. 1 to 15, the hydrogen tank 1, 111 is not limited to have such a structure as to house the hydrogen absorption unit 11 as an assembly having a heat exchange capability. Like the prior art hydrogen tank 51 in FIG. 16, the tank may house a heat exchange fin assembly which does not incorporate the hydrogen absorption alloy but has hydrogen stored (filled) therein with pressure applied and exchanges heat with hydrogen filled therein. The structure of the heat exchange fin assembly is not limited to the one shown in FIG. 16 but may have a plurality of fins 13 provided on the heating-medium pipe 12 as in the hydrogen absorption unit 11 of the above-described embodiments. A holding member which is capable of holding a hydrogen absorption alloy as an assembly but is not capable of letting a heat medium to flow may be retained in the hydrogen tank 1, 111.

In the individual embodiments in FIGS. 1 to 15, an object to be retained in the retaining chamber 2 of the hydrogen tank 1, 111 is not limited to the hydrogen absorption unit 11 but may be a fin assembly which serves as a heat exchanger.

In the individual embodiments in FIGS. 1 to 15, the hydrogen tank 1, 111 may be so constructed as not to house the hydrogen absorption unit 11.

The hydrogen absorption unit 11 is not limited to the structure that is supported at both end portions by the liner 3 but may be constructed in such a way that it is supported by the liner 3 at on the proximal end side in a cantilevered manner.

In the individual embodiments in FIGS. 1 to 15, the subject to load the hydrogen tank 1, 111 is not limited to fuel cell electric vehicles or hydrogen vehicles, but the hydrogen tank may be used, for example, as a fuel cell for a household power source. Thus, the subject to load the hydrogen tank is not limited.

In the individual embodiments in FIGS. 1 to 15, the passages for the flow of a gas in the hydrogen tank 1, 111 may be provided on the proximal-end side first lid portion 7, 41 of the liner 3 instead of the distal-end side second lid portion 9, 42. In this case, it is unnecessary to provide the passage for the hydrogen gas on the distal end side of the liner 3, thus making the fabrication of the liner 3 simpler.

In the individual embodiments in FIGS. 1 to 15, the number of O-rings 26 to be located between the body portion 5 and the first lid portion 7 (second lid portion 9) or between the peripheral surface of the opening portion 40a, 40b and the peripheral surface of the protruding portion 43 of the associated lid portion 41, 42 is not limited to one but plural O-rings may be located.

In the individual embodiments in FIGS. 1 to 15, the O-ring 26 may be made of, for example, nitrile rubber, polystyrene rubber, silicone rubber, acryl rubber, fluoride rubber or the like, and the material is not particularly limited. Not only the rubber-made O-ring 26 but also another member, such as a metal seal, may be used as the seal member.

The present invention is not limited to a hydrogen tank which stores hydrogen but may be adapted to a high pressure tank which stores another type of gas, such as nitrogen or compressed natural gas.

Although the embodiments of the present invention have been described herein in conjunction with the drawings, the present invention is not limited to the above-described embodiments but may be replaced with the subject matters as recited in the appended claims and equivalents thereof.

What is claimed is:

1. A high pressure tank comprising:
   a metal hollow liner for storing a gas at high pressure; and
   a fiber reinforced plastic layer which covers an outer surface of said liner;
   said liner including a liner body having an opening portion and a lid to be connected to said liner body in such a way as to close said opening portion; and
   said liner body and said lid having contact surfaces facing each other around said opening portion, with a seal member provided between the two contact surfaces and extending around said opening portion;
   wherein portions of said contact surfaces that come into contact with said seal member serve as seal surfaces, and
   one of said liner body and said lid have a deformable portion which is deformable by pressure in said liner in such a way as to direct one of said seal surfaces toward the other seal surface.

2. The high pressure tank according to claim 1, wherein said deformable portion has one of said seal surfaces.

3. The high pressure tank according to claim 2, wherein said liner body is cylindrical and has said opening portion in at least one axial-directional end thereof, said both seal surfaces extend in an axial direction of said liner body and said deformable portion is deformable in a radial direction of said liner body by pressure in said liner.

4. The high pressure tank according to claim 3, wherein said deformable portion has said seal surface at an outward portion with respect to said radial direction of said liner body, and said deformable portion includes a thin portion which is stretchable by pressure in said liner and which is positioned more inwardly than said seal surface with respect to said radial direction of said liner body.

5. The high pressure tank according to claim 2, wherein said liner body is cylindrical and has said opening portion in at least one axial-directional end thereof, said both seal surfaces extend in a radial direction of said liner body and said deformable portion is deformable in an axial direction of said liner body by pressure in said liner.

6. The high pressure tank according to claim 5, wherein said deformable portion has said seal surface at an outward portion with respect to said axial direction of said liner body, and said deformable portion includes a thin portion which is stretchable by pressure in said liner and which is positioned more inwardly than said seal surface with respect to said axial direction of said liner body.

7. The high pressure tank according to claim 1, wherein said deformable portion is formed by lightening a part of an inner surface of said liner body or said lid.

8. The high pressure tank according to claim 1, wherein said deformable portion includes a bendable portion which is bendable by pressure in said liner and which is formed by forming a retaining groove for retaining said seal member in said deformable portion.

9. The high pressure tank according to claim 1, wherein said liner body is cylindrical, said opening portion is one of two opening portions respectively formed in both axial-directional ends of said liner body and said lid is one of two lids respectively corresponding to said opening portions.

10. The high pressure tank according to claim 9, wherein a gas absorption unit is retained in said liner.

11. The high pressure tank according to claim 10, wherein said liner body has a projection on an inner surface of at least one axial-directional end of said liner body and said projection supports said gas absorption unit inside said liner.

12. The high pressure tank according to claim 1, wherein a gas absorption unit is retained in said liner.

13. A high pressure tank comprising:
   a hollow liner for storing a gas at high pressure gas and in which an assembly is retained; and
   a fiber reinforced plastic layer which covers an outer surface of said liner;
   said liner including a cylindrical liner body having an opening portion in at least one axial-directional end thereof, and a lid to be connected to said liner body in such a way as to close said opening portion,
   said assembly being inserted into said liner body via said opening portion,
   said lid having a protruding portion to be fitted into said opening portion and a flange larger in diameter than said protruding portion, with a seal member provided between a peripheral surface of said protruding portion and that portion of said liner body which faces said peripheral surface,
   said liner body having an annular recess portion which surrounds said opening portion at a location corresponding to said opening portion, with an annular reinforcing portion provided in said recess portion to prevent enlarging of said opening portion.

14. The high pressure tank according to claim 13, wherein said annular recess portion is open at least outward in a radial direction of said liner body and said reinforcing portion is made of fiber reinforced plastic including a bundle of fibers wound annularly.

15. The high pressure tank according to claim 13, wherein said annular recess portion is open at least in an axial direction of said liner body and said reinforcing portion is fitted in said annular recess portion from the axial direction of said liner body.

16. The high pressure tank according to claim 13, wherein said liner body is made of aluminum or an aluminum alloy and said reinforcing portion is made of stainless steel.

17. The high pressure tank according to claim 13, wherein said reinforcing portion is made of fiber reinforced plastic including a bundle of fibers stronger than a bundle of fibers of said fiber reinforced plastic layer which covers said outer surface of said liner.

* * * * *

UNITED STATES PATENT AND TRADEMARK OFFICE
CERTIFICATE OF CORRECTION

PATENT NO. : 7,169,214 B2
APPLICATION NO. : 10/762886
DATED : January 30, 2007
INVENTOR(S) : Hidehito Kubo et al.

It is certified that error appears in the above-identified patent and that said Letters Patent is hereby corrected as shown below:

Column 4, line 32, please delete "tank 1 is where" and insert therefore -- tank 1, where --;

Column 4, line 33, please delete "comes enters and exits is" and insert therefore -- enters and exits, is --;

Column 5, lines 15 and 16, please delete "absorption" and insert therefore -- absorbing --;

Column 5, line 55, please delete "screws 21 secures the first lid portion 7" and insert therefore -- screws 21, the first lid portion 7 is secured --;

Column 14, line 67, please delete "thicknesses W1" and insert therefore -- thickness W1 --;

Column 14, line 67, please delete "thickness W2" and insert therefore -- thicknesses W2 --;

Column 15, lines 44 and 45, please delete "cross section" and insert therefore -- cross-section --;

Column 17, line 3, please delete "cross section" and insert therefore -- cross-section --; and Column 17, line 32, please delete "liner 3 at on" and insert therefore -- liner 3 at --.

Signed and Sealed this

Twenty-third Day of March, 2010

David J. Kappos
*Director of the United States Patent and Trademark Office*